Nov. 30, 1965 A. L. ANDERSON ETAL 3,221,182
TRANSISTORIZED POWER INVERTER
Filed Jan. 23, 1961
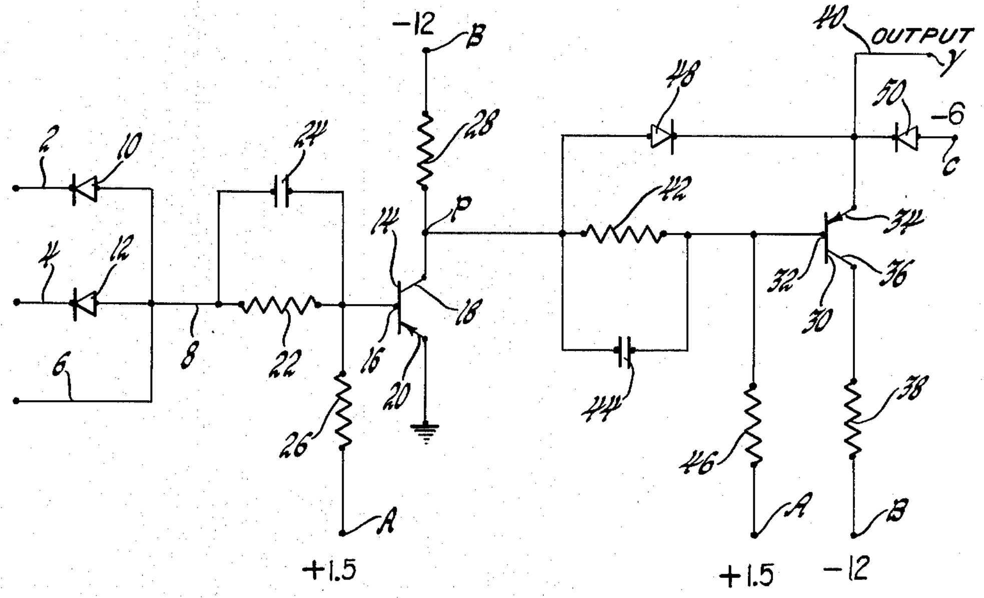
INVENTORS
Arthur L. Anderson
BY & Elden M. Tritt
Robert C. Fowler
ATTORNEY

United States Patent Office 3,221,182

Patented Nov. 30, 1965

3,221,182
TRANSISTORIZED POWER INVERTER

Arthur L. Anderson, Kokomo, Ind., and Elden M. Tritt, Orlando, Fla., assignors to General Motors Corporation, Detroit, Mich., a corporation of Delaware Filed Jan. 23, 1961, Ser. No. 84,013
1 Claim. (Cl. 307—88.5)

This invention relates to power inverter means and more particularly to transistorized power inverter amplifier means including both voltage and current amplifying means for control signals so that the output of this inverter stage can be applied to a multiplicity of other circuits for control purposes.

In gating or computing means it is often necessary to apply a single input signal to a multiplicity of locations within the complex apparatus for control and signal computing purposes. For example, a single control pulse may be simultaneously fed to as high as twenty or thirty locations at later points within the apparatus to actuate desired means. It is, therefore, necessary to not only supply voltage amplification for control pulses but also current amplification to provide sufficient power output at the same time so that the resultant output signal can be fed to and/or actuate a multiplicity of other sections. A single transistorized stage can be used only for inverting and voltage amplifying and the output of such stage used for shift registers or system clocking or any other operation has sufficient current or power to be used at perhaps four or five different points. There is insufficient power available in such a stage to apply the signal to more than about that number of locations.

It is, therefore, an object of our invention to provide a power inverter stage which supplies adequate power output from a single signal input pulse to provide operative signals at a large number of output points.

With these and other objects in view which will become apparent as the specification proceeds, our invention will be best understood by reference to the following specification and claims and the illustrations in the accompanying drawing, in which:

The figure is a circuit diagram of a power inverter embodying our invention.

In the majority of computer circuits the signal levels are conventionally either ground or minus 6 volts and in the current power amplifier, for illustrative purposes only, it will be assumed that the input and output signals are of these values. Input signals from any source may be applied to any one of the input lines 2, 4 or 6 all of which are commonly connected to trunk line 8, input line 2 being connected to line 8 through diode 10 and input line 4 similarly connected through a diode 12. Line 6 is directly connected. The inverter stage of the present power inverter includes a transistor 14 having a base electrode 16, a collector electrode 18 and an emitter electrode 20. The trunk input line 8 is connected to the base electrode 16 through a resistance 22. This resistance is shunted by a condenser 24 whose purpose is to speed up the switching operation. Base 16 is also connected to a low voltage positive biasing source A through a resistance 26. In the assumed valuation of signals handled this biasing source may be of a value of one and one-half volts positive. The collector electrode 18 is connected to a power source B which, for example, may have a value of minus 12 volts through a limiting resistor 28.

The second portion of the power inverter does not invert the signal since it is connected in opposite manner from the first. This stage is a current amplifier and is provided in order to supply a sufficient amount of power to the output so that a multiplicity of further stages and/or operative means can be supplied from this point.

In this case the transistor 30 has a base electrode 32, an emitter electrode 34 and a collector electrode 36. The collector electrode 36 is connected to the power source B which, as illustrated, is minus 12 volts through a resistance 38. This section is connected as an emitter follower stage, the output line 40 being directly connected to the emitter electrode 34. A resistance 42 is connected in series circuit between the collector electrode 18 of the transistor 14 and the base electrode 32 of the transistor 30. As in the previous case resistance 42 is shunted by condenser 44 in order to speed up the switching time. Base electrode 32 of transistor 30 is also connected through a resistor 46 to biasing potential A which is illustrated as one and one-half volts plus. A diode 48 is connected between collector 18 of first transistor 14 and the output circuit 40. A diode 50 is connected between a power supply C which may have a value of minus 6 volts or could be a tap on power supply B.

As before mentioned the first stage including transistor 14 inverts the signal input while the second stage including transistor 30 acts as a current amplifier and merely applies a sufficient amount of power of the proper voltage to the output circuit to supply a large number of points with that control signal. If it be assumed, as previously mentioned, that in most digital or computer circuits the signal levels utilized for operation are either ground or minus 6 volts, the operation of this power inverter will be described assuming a signal input to any of the input lines 2, 4 or 6. Assume first that a signal of minus 6 volts is applied to line 4, it, therefore, appears on trunk line 8. It also is applied through resistance 22 to the base 16 of transistor 14 causing this base to go negative and the transistor 14 to conduct. Since this transistor 14 is conducting and the emitter 20 is grounded the point P at the collector will be approximately at ground potential since the full 12 volt drop will occur across the resistance 28. Since point P is at ground potential the base 32 of the transistor 30 will be slightly positive due to the bias applied through resistance 46 and transistor 30 will, therefore, be held in a non-conducting condition. The output terminal Y is, therefore, held at ground by the path from output terminal Y through line 40, diode 48 to point P and thence through transistor 14 to ground. With an input signal to this stage of minus 6, therefore, the output is at ground.

If it is now assumed that the potential applied to one of the input terminals is removed so that it returns to ground or approximately ground potential, then the biasing potential of minus 6 volts will be removed from the base 16 of the transistor 14 and this transistor will now cease to conduct. The potential at point P, therefore, will now rise and by design will stabilize at approximately minus 7 or 8 volts since it is in a series circuit between the minus 12 volt supply at B and the plus one and one-half volt supply A. This series circuit is from point B through resistor 28, resistance 42, resistance 46 to point A. The switching of potential from ground to point P to minus 7 to 8 volts also reduces the voltage on the base 32 of the transistor 30 to approximately the same value and this causes transistor 30 to conduct. The limiting reisstor 38 in the collector circuit 36 limits the current through the transistor 30 and diode 50 clamps the emitter voltage to that of the supply voltage at C which may be minus 6 volts and the voltage will, therefore, remain at this value and it has sufficient current driving capacity to handle many stages in the output connected to Y to operate as many other devices and/or stages as it is desired. Thus when the input signal is minus 6 the output signal at Y is plain ground, whereas when the input signal is at ground level the output signal is at minus 6 and carries a considerable current capacity. This circuit, therefore, inverts and provides sufficient power to actuate many later stages for the operation of the various apparatus.

What is claimed is:

In a high output power inverter for supplying actuating signals to a multiplicity of control points simultaneously from a single input signal, a first transistor having base, emitter and collector electrodes, an input circuit connected to the base and emitter electrodes, electrical power supply means capable of supplying different voltages connected to the electrodes to apply proper biasing voltages, a second transistor having base, emitter and collector electrodes, conductive means connecting the collector electrode of the first transistor to the base electrode of the second transistor, an output circuit connected to the emitter electrode of the second transistor to apply output signals to any desired means, diode means connected between the emitter electrode of the second transistor and the electrical power supply means to clamp the emitter at a given voltage under certain conditions, resistance means connected to the collector electrode of the second transistor and the electrical power supply means to limit the amount of current flow through the second transistor, and second diode means connected between the collector electrode of the first transistor and the emitter electrode of the second transistor to stabilize the voltages at these two points.

References Cited by the Examiner

UNITED STATES PATENTS

| | | | |
|---|---|---|---|
| 2,874,315 | 2/1959 | Reichert | 307—88.5 |
| 2,906,871 | 9/1959 | Crawford | 330—193 X |
| 2,908,794 | 10/1959 | Hals | 328—213 |
| 2,935,626 | 5/1960 | MacSorley | 307—88.5 |
| 2,945,134 | 7/1960 | Moody | 307—88.5 |
| 2,965,855 | 12/1960 | Ketchledge | 330—164 |
| 2,991,373 | 7/1961 | Morgan | 307—88.5 |
| 3,037,132 | 5/1962 | Skerritt | 307—88.5 |
| 3,053,997 | 9/1962 | Cobbold | 307—88.5 |
| 3,103,596 | 9/1963 | Skerritt | 307—88.5 |

ARTHUR GAUSS, *Primary Examiner.*

HERMAN K. SAALBACH, JOHN W. HUCKERT, *Examiners.*